United States Patent
Fredley et al.

(10) Patent No.: US 7,223,007 B1
(45) Date of Patent: May 29, 2007

(54) METHOD AND APPARATUS FOR SELECTIVELY BACKLIGHTING A PLURALITY OF DISPLAYS WITH A COMMON LIGHT SOURCE

(75) Inventors: David S. Fredley, Tucson, AZ (US); Julio C. Castaneda, Coral Springs, FL (US); Abraham M. Haidar, Hollywood, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/300,129

(22) Filed: Dec. 14, 2005

(51) Int. Cl.
*F21V 8/00* (2006.01)
(52) U.S. Cl. .................. 362/616; 362/602; 362/629; 362/619; 362/625
(58) Field of Classification Search .............. 362/602, 362/606, 608, 609, 616, 617, 619, 623, 625, 362/629, 630
See application file for complete search history.

(56) References Cited

U.S. PATENT DOCUMENTS

| 6,600,662 | B1 | 7/2003 | Emmert et al. |
| 6,829,071 | B2 * | 12/2004 | Allen et al. ................. 359/247 |
| 6,927,747 | B2 | 8/2005 | Amirzadeh et al. |
| 7,118,264 | B2 * | 10/2006 | Tseng et al. ................. 362/561 |
| 2003/0063456 | A1 * | 4/2003 | Katahira ....................... 362/27 |
| 2003/0231483 | A1 * | 12/2003 | Higashiyama ............... 362/31 |
| 2005/0213914 | A1 | 9/2005 | Fredley et al. |

* cited by examiner

*Primary Examiner*—Laura K. Tso

(57) ABSTRACT

A device and method for optimizing lighting for a display (108) in a multi-display electronic device (100), is disclosed. The method includes emitting light waves (302) from at least one light source (244), to a back surface (122, 132) of each display in a plurality of displays (108, 110), thereby back-lighting the plurality of displays (108, 110). At least one display of the plurality of displays is selectively back-lighted.

18 Claims, 4 Drawing Sheets

METHOD AND APPARATUS FOR SELECTIVELY BACKLIGHTING A PLURALITY OF DISPLAYS WITH A COMMON LIGHT SOURCE

CROSS-REFERENCE TO RELATED APPLICATION

Not Applicable

FIELD OF THE INVENTION

The present invention generally relates to the field of electronic device display systems, and more particularly relates to light guides for such systems.

BACKGROUND OF THE INVENTION

Liquid crystal displays ("LCD") are used in a variety of electronic devices such as cellular phones, wireless devices, PDAs, and the like. LCDs are formed by stacking layers or portions of layers of materials including glass, plastic, metals, and organic films. LCDs provide both a reflective layer and a clear layer which in combination with other layers permit an image to be seen on one side of the display stack. In many hinged devices such as clamshell cellular phones, two LCDs are provided on the device. For example, many cellular phones have a main display and a caller ID ("CID") display.

LCD displays are commonly backlit using internal lights, such as from LEDs, EL panels, or lamps. Lights and/or LEDs may be located in the electronic device away from the back area of the LCDs. A light guide or light pipe can be used to couple light from the LED or lamp light source to the back of the LCDs to illuminate the LCDs.

Multi-display electronic devices may provide that the LCDs share the same light guide. This is done to reduce overall size, parts count, and cost. One problem with two or more LCDs in an electronic device sharing the same light guide is that the light is distributed among the LCD even when they do not require backlighting. Light guides shared by two LCDs are known as two-way light guides. Two-way light guides are optimized for light to travel in one preferential direction instead of two directions. For example, two-way light guides are optimized for the light to travel in the direction of the main display with a significantly lower amount of light reaching the CID display. These "leaky" light guides take light from the main display to illuminate the CID display, thereby providing sub-optimal lighting for the CID display.

Therefore a need exists to overcome the problems with the prior art as discussed above.

SUMMARY OF THE INVENTION

Briefly, in accordance with the present invention, disclosed are a method and device for optimizing back-lighting for a display in a multi-display electronic device. The method comprises emitting light waves from at least one light source, to a back surface of each display in a plurality of displays, thereby back-lighting the plurality of displays. At least one display of the plurality of displays is selectively back-lighted.

In yet another embodiment of the present invention, an electronic device for optimizing lighting for a display in a multi-display electronic device is disclosed. The electronic device comprises at least one light source and a controller electrically coupled to the at least one light source. A plurality of displays including at least a first display and a second display is also included. The electronic device also comprises a back-lighting selecting means electrically coupled to the at least one light source and the controller. The back-lighting selecting means selectively shutters at least one display of the plurality of displays at least one of open and closed. A light guide for channeling light emitted from the at least one light source to a back surface of each display of the plurality of displays is also included.

In yet a further embodiment, a wireless communications device is disclosed. The wireless communications device comprises at least one wireless transceiver for receiving and transmitting wireless communications. At least one light source and a controller electrically coupled to the at least one light source is also included. The wireless communications device also comprises at least a first display electrically coupled to the controller and at least a second display electrically coupled to the controller. A back-lighting selecting means electrically coupled to the at least one light source and the controller is also included. The back-lighting selecting means selectively shutters at least one of the at least first display and the at least second display at least one of open and closed for selectively back-lighting at least one of the at least first display and the at least second display. The wireless communications device also includes a light guide for channeling light emitted from the at least one light source to a back surface of each display of the plurality of displays.

An advantage of the foregoing embodiments of the present invention is that lighting for a display in a multi-display electronic device is optimized. Light intended to back-illuminate a first display is not "leaked" through a light guide illuminating a second display. Bi-stable clear/reflective layers are used to reflect light from a portion of the light guide used by a display not intended for back-illumination to a display intended for back-illumination. A more vibrant and fully back-lit display is achieved.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The present invention, according to an embodiment, overcomes problems with the prior art by providing an optimized back-lighting means for producing vibrant light in both a first and a second display on an electronic device. While an electronic device is intended to be broadly covering many different types of devices that operate electronically, for this example the discussion will illustrate aspects of the present invention by discussing a wireless device. An electronic device, for example, and not for any limitation, should be understood to include at least any one or a combination of the following: a cellular telephone, a mobile phone, a smartphone, a two-way radio, a wireless device, a wireless messaging device, a PC, a pocket PC, an electronic organizer, and a personal digital assistant, and other electronic devices. The term wireless device is intended to broadly cover many different types of devices that can wirelessly receive signals, and optionally can wirelessly transmit signals, and may also operate in a wireless communication system. For example, and not for any limitation, a wireless device can include any one or a combination of the following: a cellular telephone, a mobile phone, a smartphone, a two-way radio, a two-way pager, a wireless messaging device, and the like.

Figure 1:
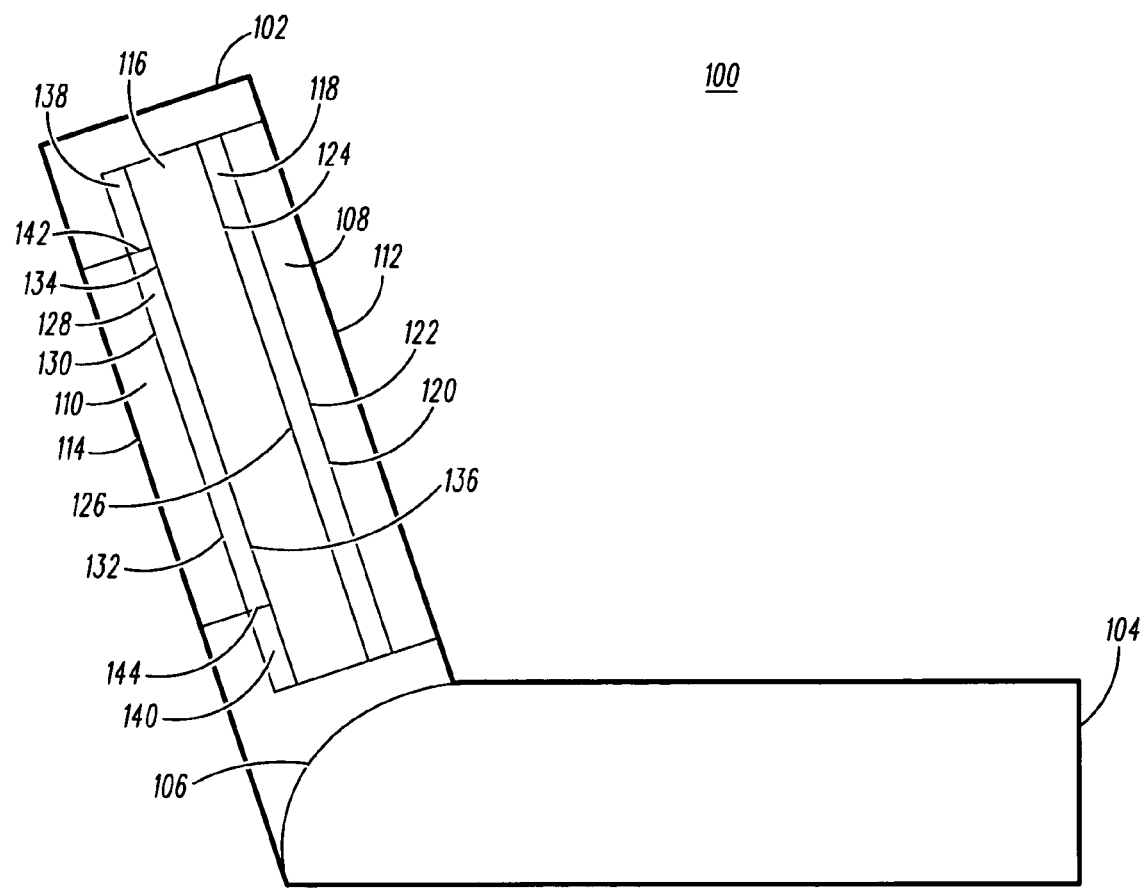
FIG. 1 illustrates a cross-sectional view of an exemplary electronic device, according to an embodiment of the present invention.

According to an embodiment of the present invention an exemplary wireless device 100 in an open position is shown in FIG. 1. The wireless device 100 comprises a display portion 102 and a body portion 104. The display portion 102 and the body portion 104 are connected to each other by a hinge 106. A first display 108 and a second display 110 reside within the display portion 102 of the wireless device 100. A first open area 112 in the display portion 102 allows for viewing of the first display 108. A second open area 114 in the display portion 102 allows for viewing of the second display 110. The first display 108, for example, is the main display of the wireless device 100. The second display, for example, is the caller ID display ("CID") of the wireless device 100. In one embodiment of the present invention, a lens or transparent material such as glass, plastic, quartz, or the like is positioned within the first open area 112 and the second open area 114 to allow improved viewing and/or to protect the first display 108 and the second display 110. The hinge 106 includes a central region (not shown) and the axis of rotation (not shown) is normal to the hinge 106 and passes through the central region (not shown).

The wireless device 100, in this example, also includes a light guide 116 that is positioned between the first display 108 and the second display 110. Also one or more LEDs (not shown), lamps (not shown), or the like are located within the wireless device 100 so that light is emitted into the light guide 116. The light guide 116 delivers the emitted light to at least one of the primary display 108 and the secondary display 110. In one embodiment, the light guide 116 has a length and width that is substantially equal to the length and width of the first display 108. A first bi-stable clear/reflective layer 118 is positioned between a back surface 122 of the primary display 108 and the light guide 116. The first bi-stable clear/reflective layer 118 has a first surface 120 facing the back surface 122 of the primary display 108 and a second surface 124 facing a surface 126 of the light guide 116.

A second bi-stable clear/reflective layer 128 is positioned between the second display 110 and the light guide 116. A front surface 130 of the second bi-stable clear/reflective layer 128 faces a back surface 132 of the second display 110. A back surface 134 of the second bi-stable clear/reflective layer 128 covers a back surface 136 of the light guide 116. In one embodiment, two additional reflective layers 138, 140 that are separate from the second bi-stable clear/reflective layer 128 are respectively positioned adjacent to each end 142, 144 of the second bi-stable clear/reflective layer 128. The additional reflective layers 138, 140 can be any material capable of reflecting light such as tin, nickel, copper, zinc, aluminum, silver, gold, chromium, alloys, composites, and the like. The first bi-stable clear/reflective layer 118, the second bi-stable clear/reflective layer 128, and the two additional reflective layers 138, 140 are deposited by well known methods to those of ordinary skill in the art.

In one embodiment, the first and second bi-stable clear/reflective layers 118, 128 have a length and width substantially equal to the length and width of the first and second displays 108, 110 respectively. For example, in FIG. 1 the second display 110 is centered over and has a shorter length than the first display 108. The second bi-stable clear/reflective layer 128 only extends as far as the second display 110. The two additional reflective layers 138, 140 extend outwardly from each end 142, 144 of the second display 110 along the remaining area of the back surface 136 of the light guide that is not covered by the second bi-stable clear/reflective layer 128. In another embodiment, the second display 110 is positioned in a staggered manner respective of the main display 108.

Figure 2:
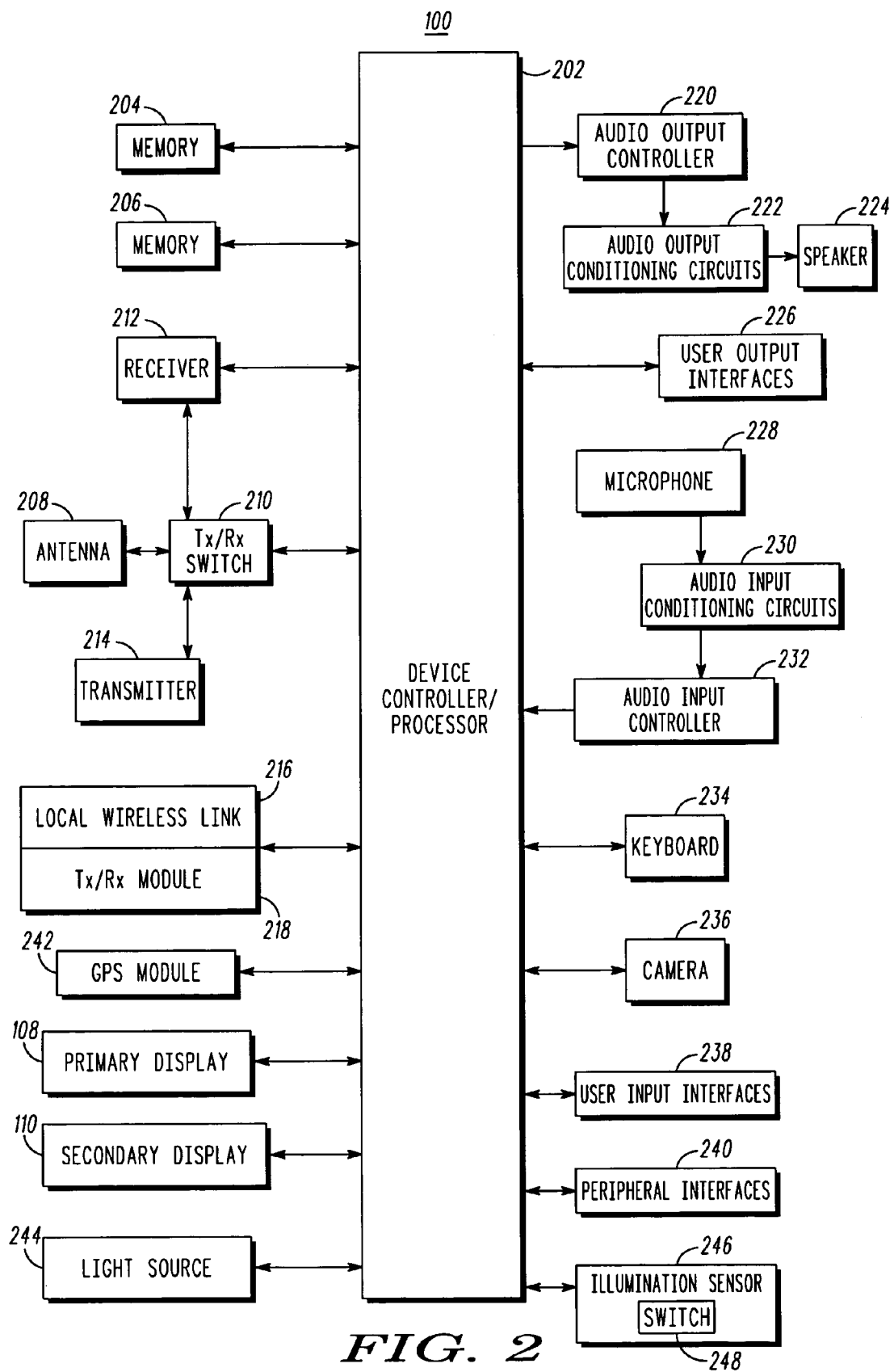
FIG. 2 is a block diagram illustrating a more detailed view of the electronic device of FIG. 1.

Referring to FIG. 2, a more detailed view of the wireless device 100 is illustrated. The wireless device 100 operates under the control of a device controller/processor 202, that switches the wireless device 100 between receive and transmit modes. In receive mode, the device controller 202 electrically couples an antenna 208 through a transmit/receive switch 210 to a receiver 212. The receiver 212 decodes the received signals and provides those decoded signals to the device controller 202. In transmit mode, the device controller 202 electrically couples the antenna 208, through the transmit/receive switch 210, to a transmitter 214. The device controller 202 operates the transmitter and receiver according to instructions stored in the memory 204. These instructions include, for example, a neighbor cell measurement-scheduling algorithm.

FIG. 2 also includes non-volatile storage memory 206 for storing, for example, an application waiting to be executed (not shown) on the wireless device 100. The wireless device 100, in this example, also includes a local wireless link 216 that allows the wireless device 100 to directly communicate with another wireless device (not shown) without using a wireless network (not shown). The local wireless link 216, for example, is provided by Integrated Enhanced Digital Network (iDEN), Bluetooth, Infrared Data Access (IrDA) technologies, or the like. The local wireless link 216 also includes a local wireless link transmit/receive module 218 that allows the wireless device 100 to directly communicate with another wireless device (not shown).

The wireless device 100 of FIG. 2 further includes an audio output controller 220 that receives decoded audio output signals from the receiver 212 or the local wireless link transmit/receive module 218. The audio controller 220 sends the received decoded audio signals to the audio output conditioning circuits 222 that perform various conditioning functions. For example, the audio output conditioning circuits 222 may reduce noise or amplify the signal. A speaker 224 receives the conditioned audio signals and allows audio output for listening by a user. The wireless device 100 further includes additional user output interfaces 226, for example, a head phone jack (not shown) or a hands-free speaker (not shown).

The wireless device 100 also includes a microphone 228 for allowing a user to input audio signals into the wireless device 100. Sound waves are received by the microphone 228 and are converted into an electrical audio signal. Audio input conditioning circuits 230 receive the audio signal and perform various conditioning functions on the audio signal, for example, noise reduction. An audio input controller 232 receives the conditioned audio signal and sends a representation of the audio signal to the device controller 202.

The wireless device 100 also comprises a keyboard 234 for allowing a user to enter information into the wireless device 100. The wireless device 100 further comprises a camera 236 for allowing a user to capture still images or video images into memory 204. Furthermore, the wireless device includes additional user input interfaces 238, for example, touch screen technology (not shown), a joystick (not shown), or a scroll wheel (not shown). In one embodiment, a peripheral interface 240 is included for allowing the connection of a data cable to the wireless device 100. In one embodiment of the present invention, the connection of a data cable allows the wireless device 100 to be connected to a computer or a printer.

An optional Global Positioning System (GPS) module 242, for example, is also included on the wireless device for determining location and/or velocity information of the wireless device 100. This module 242 uses the GPS satellite system to determine the location and/or velocity of the wireless device 100. Alternative to the GPS module 242, the wireless device 100 may include alternative modules for determining the location and/or velocity of wireless device 100, for example, using cell tower triangulation and assisted GPS.

As discussed above with respect to FIG. 1, the wireless device 100 includes a first display 108 for displaying information to the user of the wireless device 100. A second display 110, for example, a caller ID display is also included. At least one light source 244 is driven by the device controller 202. The at least one light source provides light for illuminating the first display 108 and the second display 110. The wireless device 100 also includes an illumination sensor 246 for determining which display 108, 110 to selectively illuminate. In one embodiment, the lighting sensor comprises at least one switch 248 for signaling the illumination sensor when the wireless device 100 is opened or closed. The switch 248, for example, can be magnetic, push-type, or the like.

Figure 3:
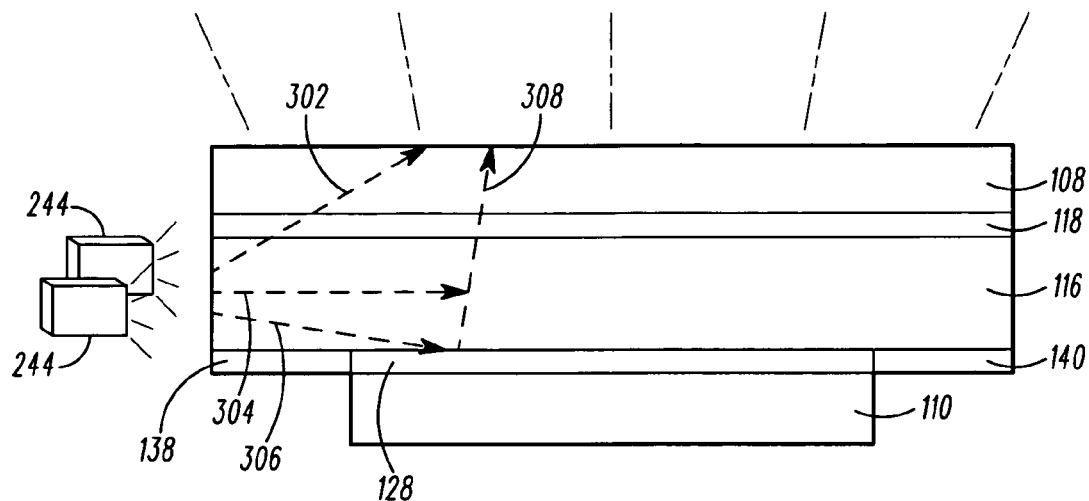
FIG. 3 is a cross-sectional view of a display portion of the electronic device of FIG. 1, wherein a first display is back-illuminated, and a second display is not back-illuminated, according to an embodiment of the present invention.
Figure 4:
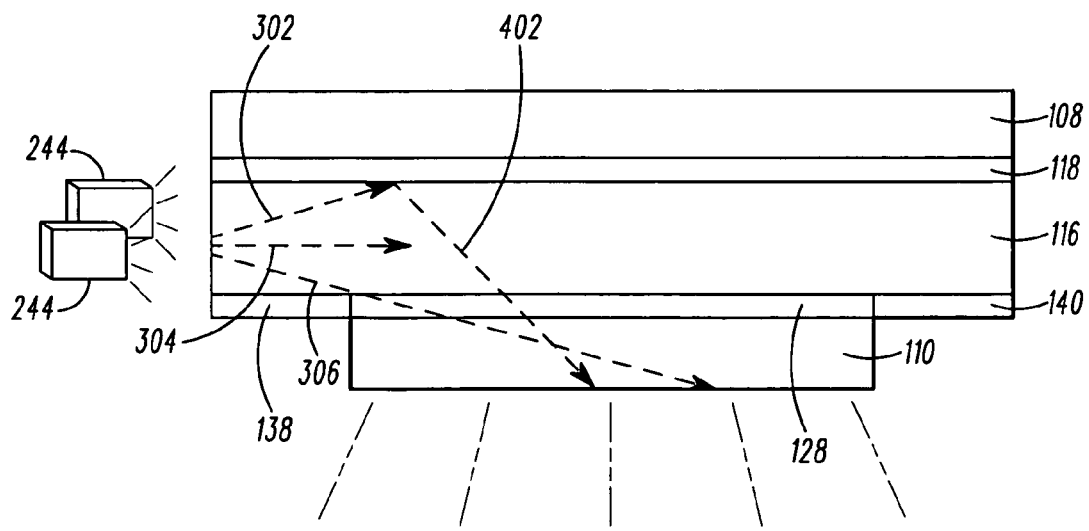
FIG. 4 is a cross-sectional view of a display portion of the electronic device of FIG. 1, wherein the second display is back-illuminated, and the first display is not back-illuminated, according to an embodiment of the present invention.

Referring now to FIG. 3 and FIG. 4, cross sectional views of the display portion 102 of the wireless device 100 are shown. FIG. 3 shows an embodiment of the present invention wherein light waves reflect off of the second bi-stable clear/reflective layer 128 and pass through the first bi-stable clear/reflective layer 118. The light sources 244 emit light waves into the light guide 116. Although FIG. 3 shows two light sources, one or more light sources may also be used. In one embodiment, two or more light sources are used to provide full lighting and dimmed lighting. For example, in a full lighting mode, all of the lighting sources 244 are on and in a dimmed lighting mode one or more but not all of the lighting sources are on. The light sources 244 can be optically coupled to the light guide 116, which in turn can be optically coupled to the first and second displays 108, 110 for channeling light from the light sources 244 to the displays 108, 110. As used herein, "optically coupled" means coupled or connected in an arrangement such that light can be transmitted from one location to another. As also used herein, the term "light" refers to electromagnetic radiation within or even outside of the visible light spectrum.

The light sources 244, for example, can be any light source that emits, at least, light within the visible light spectrum. For example, the light sources 244 include one or more LEDs each, incandescent bulbs, cold cathode lamps, monochromatic sources such as lasers, organic light emitting diodes ("OLED"), transparent OLED's ("TOLED"), phosphorescent OLED's ("PHOLED"), stacked OLED technologies ("SOLED"), or the like. The first and second displays 108, 110, in one embodiment, are LCDs, electrochromics, polymer-dispersed liquid crystals ("PDLCs"), or other passive light shuttering devices.

The light guide 116 channels light from the light sources 244 to the first and second displays 108, 110. The light guide 116 can be constructed of any appropriate material that is known in the art, for example, transparent polymers, glass, and/or plastics. In one embodiment, the light guide 116 is transparent for optimal transmission of light. The light guide 116 is not limited in shape as the light guide 116 can include flat, bent, curved, and angled portions. Additionally, the light guide, in one embodiment, includes light directing portions (not shown) that can be arranged at particular angles for directing the light in a particular direction. In another embodiment, the light guide 116 includes microstructures such as microwedges within the material used for the light guide 116.

The light from the light sources 244 travels in various directions as shown by the dashed lines 302, 304, 306. This light is scattered off of the reflective surfaces (the first bi-stable clear/reflective layer 118 or the second bi-stable clear/reflective layer 128 and the two additional reflective layers 138, 140) and illuminates either the first or second display 108, 110.

The bi-stable clear/reflective material, which forms the first bi-stable clear/reflective layer 118 and the second bi-stable clear/reflective layer 128, has two modes. One mode is the clear mode wherein the bi-stable clear/reflective material is at least partially transparent to some or all wavelengths in the visible region. The other mode is the reflective mode wherein the bi-stable clear/reflective material reflects some or all wavelengths in the visible region, which are incident upon it. Bi-stable clear/reflective material switches from an optically clear mode to reflective mode upon the application of voltage pulse. Additionally, bi-stable clear/reflective material switches from reflective mode to an optically clear mode upon the application of voltage.

In an exemplary embodiment of the present invention, the bi-stable clear/reflective material is comprised of cholesteric liquid crystals. Cholesteric liquid crystals are chiral, twisted molecules with a high degree of order along one axis. Along that axis they are periodic. The reflective mode of a cholesteric liquid crystal occurs when the liquid crystal is in the planar state. The clear mode of a cholesteric liquid crystal occurs when the liquid crystal is in the focal conic mode. The cholesteric liquid crystals will switch from one mode to the other upon application of a pulse of voltage. As an example, a 50 V pulse for 10 to 20 msec is sufficient for mode switching of cholesteric liquid crystals. Additionally, cholesteric liquid crystals have "memory, that is, they are stable in clear and reflective states, thereby only requiring power to switch between the two states and not to maintain the state of the material. The present invention is not limited to cholesteric liquid crystals, any bi-stable clear/reflective material such as ferro-electric liquid crystals may also be used to cover the region on the light guide 116 to be used by the first and second displays 108, 110.

In one embodiment, the illumination sensor 246 (FIG. 2) senses when the body portion 104 and the display portion 102 are rotated in or out of a closed position. When the illumination sensor 146 senses a position change, electrodes (not shown) apply a switching voltage to the first bi-stable clear/reflective layer 118 and the second bi-stable clear/reflective layer 128 simultaneously. An electrode applying the switching voltage, for example can be a part of an array of electrodes operable to control the pixel in an LCD stack, as is known to those of ordinary skill in the art. The application of voltage to the first bi-stable clear/reflective layer 118 and the second bi-stable clear/reflective layer 128 occurs, for example, simultaneously so that the first bi-stable clear/reflective layer 118 and the second bi-stable clear/reflective layer 128 will switch modes simultaneously, providing one layer of reflective and one layer of clear material at all times. Thus, one of either the first bi-stable clear/reflective layer 118 or the second bi-stable clear/reflective layer 128 will act as a reflective layer for selectively illuminating either one of the first display 108 or the second display 110. In an alternative embodiment, the switching can also occur non-simultaneously.

In FIG. 3, the wireless device 100 is in an open position (not shown). Therefore, the first bi-stable clear/reflective layer 118 is in an optically clear mode and the second bi-stable clear/reflective layer 128 is reflective. Light waves (illustrated by the dashed line 306) hit the second cholesteric layer 128, which is in a reflective mode, covering the area of the light guide 116 used by the second display 110. The waves are then reflected (as illustrated by the dashed line 308) and pass through the first cholesteric layer 118, which is in an optically clear mode, covering the area of the light guide 116 used by the first display 108, thereby illuminating the first display 108.

In FIG. 4, the wireless device 100 is in a closed position (not shown). Therefore, the first bi-stable clear/reflective layer 118 is in a reflective mode and the second bi-stable clear/reflective layer 128 is in an optically clear mode. Light waves (illustrated by the dashed line 306) hit the first cholesteric layer 118, which is in a reflective mode, covering the area of the light guide 116 used by the first display 108. The waves are then reflected (as illustrated by the dashed line 402) and pass through the second cholesteric layer 128, which is in an optically clear mode, covering the area of the light guide 116 used by the second display 110, thereby illuminating the second display 110.

In an alternative embodiment, the first bi-stable clear/reflective layer 118 and the second bi-stable clear/reflective layer 128 are both in an optically clear state. In this embodiment, a light source(s) 244 with sufficient lighting is used so that the device controller 202 switches both bi-stable layers to a clear state, thereby illuminating the first and second displays 108, 110.

One advantage of the present invention is that light emitted by a light source is not shared by the first and second displays 108, 110 at the same time. Accordingly, a brighter more vibrant illumination of the respective display is possible. Another advantage is that the reflection/transmittance is achieved without using polarizers, which reduce the light transmittance by a considerable amount causing less vibrant displays.

The illumination sensor 246 (FIG. 2) in one embodiment is comprised of at least one switch 248 (FIG. 2). The illumination sensor 246 (FIG. 2), in one embodiment is a mechanical switch, piezo-electric switch, pneumatic switch, shape memory based switch, solenoid based switch, or the like. In one embodiment, both the body portion 104 and the display portion 102 of the wireless device each comprise a switch 248 that make up the illumination sensor 246. In an alternative embodiment a single switch 248 is located on the body portion 104 of the wireless device. Upon rotation of the display portion 102 with respect to the body portion 104, which results in the wireless device 100 being in an open or closed position, the switch 248 is activated. In the embodiment with a switch 248 located on both portions 102, 104 of the wireless device 100, the illumination sensor 246 senses a position change of the body and display portions 102, 104 upon contact and release of the switches with one another. A switch 248, in one embodiment is magnetic and is activated when a magnetic switch (not shown) on the body portion 104 and a magnetic switch (not shown) on the display portion 102 come into being proximally located above each other or are removed from being proximally located above each other (by rotating the display portion 102 to an open or closed position.

Upon sensing a position change of the display portion 102, a signal is sent to a power source (not shown) within the wireless device 100. Upon receiving the signal, the power source (not shown) applies a pulse of voltage simultaneously, to the first bi-stable clear/reflective layer 118 and the second bi-stable clear/reflective layer 128. Each voltage pulse applied to the first bi-stable clear/reflective layer 118 and the second bi-stable clear/reflective layer 128 switches the modes of the first bi-stable clear/reflective layer 118 and the second bi-stable clear/reflective layer 128. Switching modes simultaneously ensures that there is always one reflective layer and one optically clear layer at all times. The wireless device 100, in one embodiment, is configured so that the second bi-stable clear/reflective layer 128 is reflective and the first bi-stable clear/reflective layer 118 is clear when the wireless device 100 is in the open position. In another embodiment, the second bi-stable clear/reflective layer 128 is clear and the first bi-stable clear/reflective layer 118 is reflective when the wireless device 100 is in the closed position. Although switching modes is not required to be simultaneous, a rapid transition is desirable in some embodiments of the invention, while other embodiments of the invention contemplate that the modes switch non-simultaneously.

The inclusion of the first bi-stable clear/reflective layer 118 and the second bi-stable clear reflective layer 128 allows for the plurality of displays 108, 110 to be selectively back-lit by changing the states of the first bi-stable layer 118 and the second bi-stable layer 128. As already discussed above, the illumination sensor 246 determines which display 108, 110 to back-light. For example, if the primary display 108 is to be selectively back-lit, the bi-stable clear/reflective layer associated with the primary display 108 is electrically shuttered open so that light waves 302 pass through the respective bi-stable clear/reflective layer and back-light the primary display 108. The bi-stable clear/reflective layer associated with the secondary display 110 is electrically shuttered closed so that light waves 302 emitted by the light source 244 reflect off of the respective bi-stable clear/reflective layer towards the primary display 108.

Figure 5:
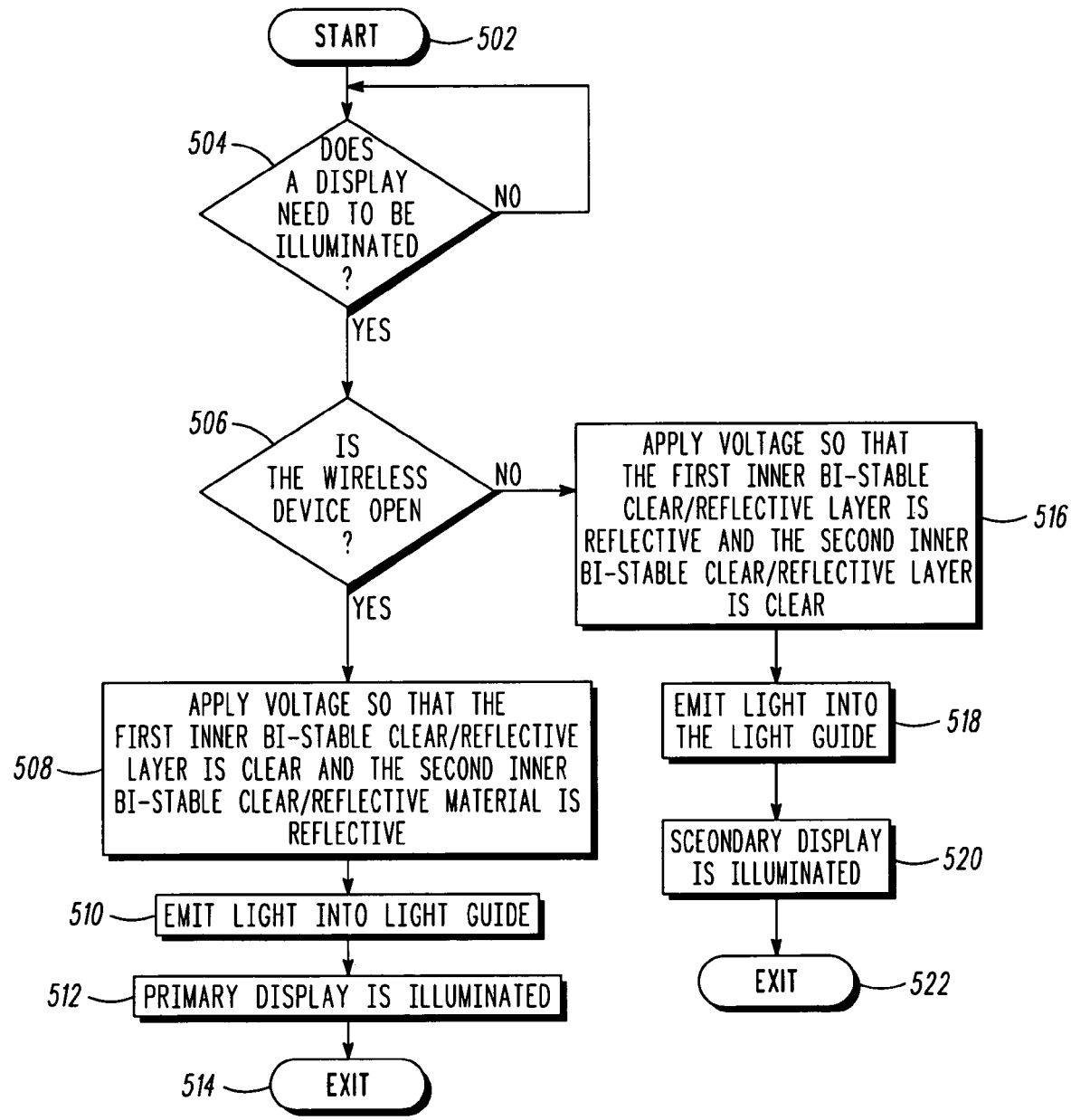
FIG. 5 is an exemplary operational flow diagram illustrating a process of selectively illuminating the first and second displays of the electronic device of FIG. 1, according to an embodiment of the present invention.

FIG. 5 is an operational flow diagram illustrating an exemplary process of selectively illuminating the first display 108 and the second display 110. The operational flow diagram of FIG. 5 begins with step 502 and flows directly to step 504. The device controller 202, at step 504, determines whether a display needs to be illuminated. For example, the illumination sensor 246 may detect that the display portion 102 of the wireless device 100 has been rotated into an open or closed position. Additionally, the illumination sensor 246 may detect that a display 108, 110 needs to be illuminated because an incoming call is being received or that a button (not shown) on the wireless device 100 has been pressed. If the result of this determination is positive, the control flows to step 506. If the result of this determination is negative, the device controller 202 continues to monitor if a display 108, 110 needs to be illuminated.

The device controller 202, at step 506, determines whether the wireless device 100 is open. For example, the switch 248 in the illumination sensor 246 sends a signal notifying the illumination sensor 246 that the position of the display portion 102 respective to the body portion 104 has changed. If the result of this determination is positive, the control flows to step 508. A voltage, at step 508, is applied to the first bi-stable clear/reflective layer 118 and to the second bi-stable clear/reflective layer 128 so that the first bi-stable clear/reflective layer 118 is clear and the second bi-stable clear/reflective layer 128 is reflective. The light source 244, at step 510, emits light into the light guide 116 and the first display, at step 512, is illuminated. The control flow then exits at step 514.

If the result of the determination, at step 506, is negative, the control flows to step 516. A voltage, at step 516, is applied to the first bi-stable clear/reflective layer 118 and to the second bi-stable clear/reflective layer 128 so that the first bi-stable clear/reflective layer 118 is reflective and the second bi-stable clear/reflective layer 128 is clear. The light source 244, at step 518, emits light into the light guide 116 and the second display, at step 520, is illuminated. The control flow then exits at step 522.

An advantage of the present invention is that bi-stable clear/reflective material such as cholesteric film covers the areas of a light guide that is used by a first and second display 108, 110. Depending on the position of the display portion of the wireless device 100, one layer of the bi-stable clear/reflective layer covering the area of the light guide used by the display which is not needed to be illuminated is electrically shuttered. The other layer of the bi-stable clear/reflective layer covering the area of the light guide used by the display which is needed to be illuminated is set to a clear mode. Light waves hitting the electrically shuttered bi-stable clear/reflective material are reflected so that at least a majority of the emitted light waves pass through the bi-stable clear/reflective material to illuminate the respective display. A more vibrant and fully illuminated display is obtained.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for optimizing back-lighting for a display in a multi-display electronic device, the method comprising:
   emitting light waves from at least one light source, to a back surface of each display in a plurality of displays, thereby back-lighting the plurality of displays; and
   selectively back-lighting at least one display of the plurality of displays;
   wherein the selectively back-lighting comprises:
      electrically shuttering opening at least a first bi-stable clear/reflective layer associated with at least a first display in the plurality of displays to be selectively back-lighted; and
      electrically shuttering closed at least a second bi-stable clear/reflective layer associated with at least a second display in the plurality of displays for reflecting the emitted light waves.

2. The method of claim 1, further comprising:
   applying a voltage to the at least first bi-stable clear/reflective layer and the at least second bi-stable clear/reflective layer, thereby switching the at least first bi-stable clear/reflective layer and the at least second bi-stable clear/reflective layer from one of a clear state and a reflective state to one of the clear state and the reflective state, respectively.

3. The method of claim 2, wherein the at least first bi-stable clear/reflective layer and the at the at least second bi-stable clear/reflective layer maintain one of a clear and reflective state until the voltage is applied to the at least first bi-stable clear/reflective layer and the at the at least second bi-stable clear/reflective layer, respectively.

4. The method of claim 1, wherein the at least first bi-stable clear/reflective layer is deposited on a first surface of a light guide, the first surface of the light guide facing a back surface of the at least first display, and wherein the at least second bi-stable clear/reflective layer is deposited on a second surface of the light guide, the second surface of the light guide facing a back surface of the at least second display.

5. The method of claim 4, wherein the light guide channels the light waves emitted by the at least one light source to the at least first display and the at least second display.

6. The method of claim 1, wherein the at least first bi-stable clear/reflective layer and the at least second bi-stable clear/reflective layer comprises at least cholesteric material.

7. An electronic device comprising:
   at least one light source;
   a controller electrically coupled to the at least one light source;
   a plurality of displays including at least a first display and a second display;
   a back-lighting selecting means electrically coupled to the at least one light source and the controller for selectively shuttering at least one display of the plurality of displays at least one of open and closed; and a light guide for channeling light emitted from the at least one light source to a back surface of each display of the plurality of displays.

8. The electronic device of claim 7, further comprising:
at least a first bi-stable clear/reflective layer and at least a second bi-stable clear/reflective layer, wherein the first bi-stable clear/reflective layer is deposited on a first surface of the light guide, the first surface of the light guide facing a back surface of the at least first display, and wherein the at least second bi-stable clear/reflective layer is deposited on a second surface of the light guide, the second surface of the light guide facing a back surface of the at least second display.

9. The electronic device of claim 7, wherein at least one display of the plurality of displays is situated above another display of the plurality of displays.

10. The electronic device of claim 7, wherein at least one display of the plurality of displays is situated opposite to another display of the plurality of displays.

11. The electronic device of claim 8, wherein the at least first bi-stable clear/reflective layer and the at least second bi-stable clear/reflective layer are in opposite bi-stable modes.

12. The electronic device of claim 7, wherein the electronic device comprises at least one of a cellular telephone, a smartphone, a two-way radio, a wireless device, a wireless messaging device, a personal digital assistant, and a multimedia player.

13. The electronic device of claim 8, further comprising a power source for applying a voltage to the at least first bi-stable clear/reflective layer and the at least second bi-stable clear/reflective layer, thereby switching the at least first bi-stable clear/reflective layer and the at least second bi-stable clear/reflective layer from one of a clear state and a reflective state to one of the clear state and the reflective state, respectively.

14. The electronic device of claim 13, wherein the at least first bi-stable clear/reflective layer and the at the at least second bi-stable clear/reflective layer maintain one of the clear state and the reflective state until the voltage is applied to the at least first bi-stable clear/reflective layer and the at the at least second bi-stable clear/reflective layer, respectively.

15. The electronic device of claim 8, wherein the at least first bi-stable clear/reflective layer and the at least second bi-stable clear/reflective layer comprises at least cholesteric material.

16. A wireless communications device comprising:
at least one wireless transceiver for receiving and transmitting wireless communications;
at least one light source;
a controller electrically coupled to the at least one light source;
at least a first display electrically coupled to the controller;
at least a second display electrically coupled to the controller;
a back-lighting selecting means electrically coupled to the at least one light source and the controller for selectively shuttering at least one of the at least first display and the at least second display at least one of open and closed for selectively back-lighting at least one of the at least first display and the at least second display; and
a light guide for channeling light emitted from the at least one light source to a back surface of each display of the plurality of displays.

17. The wireless communications device of claim 16, further comprising:
at least a first bi-stable clear/reflective layer and at least a second bi-stable clear/reflective layer, wherein the first bi-stable clear/reflective layer is deposited on a first surface of the light guide, the first surface of the light guide facing a back surface of the at least first display, and wherein the at least second bi-stable clear/reflective layer is deposited on a second surface of the light guide, the second surface of the light guide facing a back surface of the at least second display.

18. The wireless communications device of claim 17, wherein the at least first bi-stable clear/reflective layer and the at least second bi-stable clear/reflective layer comprises at least cholesteric material.

* * * * *